(No Model.)
T. MOORE.
SELF LUBRICATING AXLE BOX.
No. 501,727.  Patented July 18, 1893.
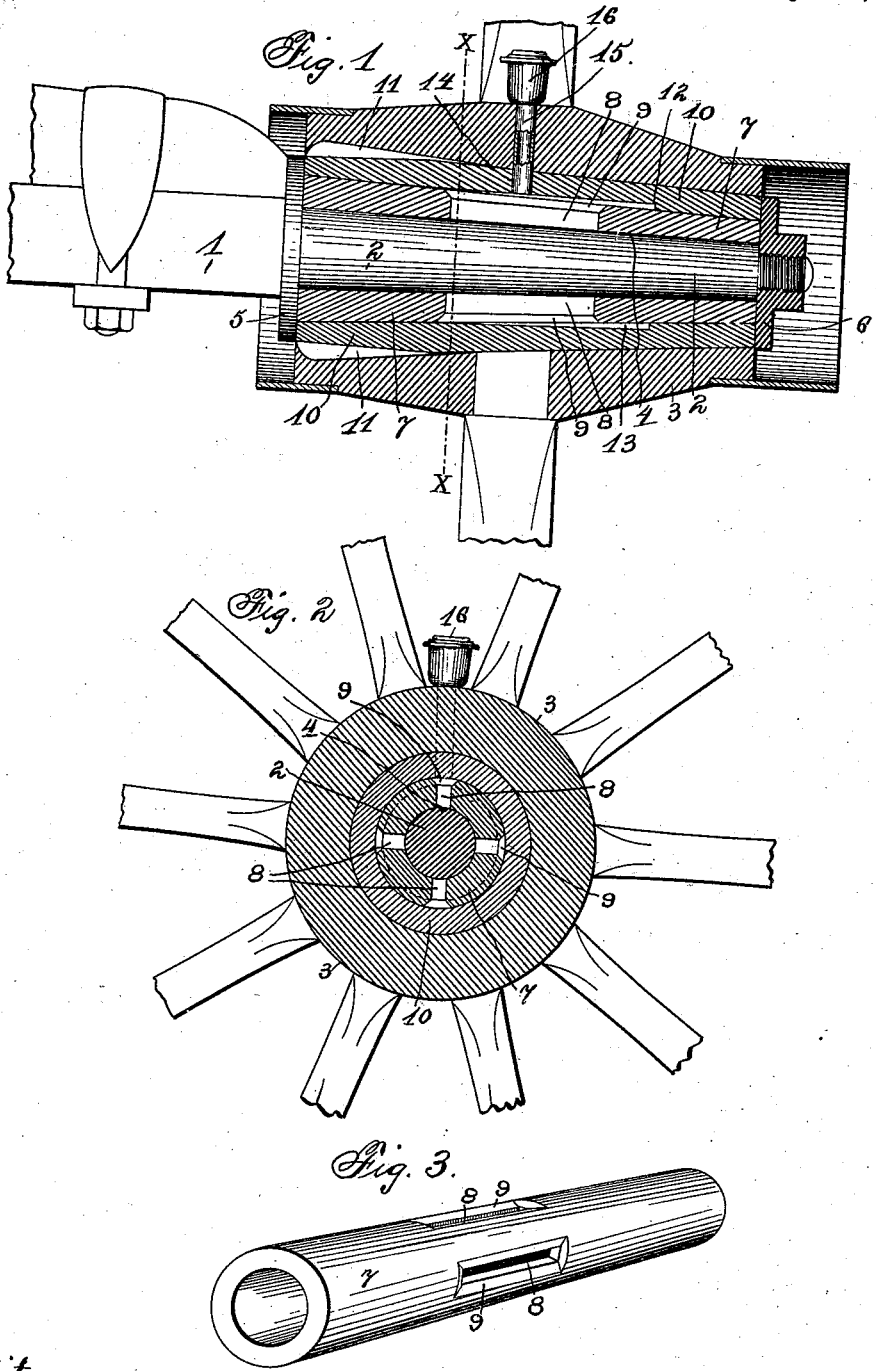
Witnesses:
W. J. Sankey
G. E. Schefers
Inventor,
Thomas Moore
By Higdon & Higdon & Longan
Atty's

UNITED STATES PATENT OFFICE.

THOMAS MOORE, OF CHEYENNE, WYOMING.

SELF-LUBRICATING AXLE-BOX.

SPECIFICATION forming part of Letters Patent No. 501,727, dated July 18, 1893.

Application filed April 24, 1893. Serial No. 471,610. (No model.)

*To all whom it may concern:*

Be it known that I, THOMAS MOORE, of the city of Cheyenne, Laramie county, and State of Wyoming, have invented certain new and useful Improvements in Self-Lubricating Axle-Boxes, of which the following is a full, clear, and exact description, reference being had to the accompanying drawings, forming a part hereof.

My invention relates to "self lubricating axle boxes" and consists in the novel construction, combination and arrangement of parts hereinafter described and designated in the claim.

The object of my invention is to provide an improved axle-box, which shall have increased wearing surfaces and improved means of lubrication of the frictional parts.

In the drawings: Figure 1 is a sectional side elevation of portions of an axle having my self lubricating axle-box applied thereto. Fig. 2 is a section taken on the line X—X of Fig. 1. Fig. 3 is a detail view in perspective of a loose tapered-sleeve made use of in carrying out the invention.

1 indicates the axle, 2 the spindle, and 3 the hub. The spindle 2 is of the ordinary construction, with the exception that it is provided upon its upper side with a longitudinal groove 4, which terminates a distance from the ends of said spindle. The axle is provided with the usual butting ring 5 and threaded nut 6. Loosely mounted to revolve upon the axle is a sleeve 7 having a bore tapered to fit said axle and a smooth exterior surface and tapered in a direct line from its inner end outward to its outer end. Formed in the walls of this sleeve is a series of radial slots 8 extending longitudinally of the sleeve, but terminating a distance away from the ends thereof. These radial slots are provided with outwardly flaring exterior sides 9 and ends, for a purpose hereinafter mentioned.

The box 10 is provided with the usual ribs or wings 11 to prevent its turning in the hub 3; it has a smooth interior surface, tapered from its inner end outward to loosely turn upon the exterior of the sleeve 7, and is properly fixed within said hub to revolve therewith. Formed in the inner face of the box 10 is an annular shoulder 12 located at a point adjacent the outer end of said box.

13 indicates an annular space formed in the inner face of said box and having the shoulder 12 as its outer end. This space extends inward in the direction of the length of said box to a point opposite the inner ends of the radial slots 8 in the sleeve 7, and then merges into the said inner surface of said box. An oil passage 14 is formed in the box 10 so as to communicate with the annular space 13, and an oil passage is formed in the hub between two of the spokes and communicates with the oil passage in said box and extends outwardly to the outer surface of the said hub. In some cases I may locate a tube 15 in both these oil passages, which are in alignment, and mount an oil cup 16 upon the outer end of this tube.

The operation is a follows: Oil or lubricant being supplied to the oil passages in the hub and the box 10, freely passes into the annular space 13 encircling the loose sleeve 7, and thereby lubricates the frictional surfaces between said box and said sleeve, throughout their area, and as the hub and box are revolved portions of the lubricant pass inward through the radial slots 8 onto the spindle 2, into the longitudinal groove 4 in said axle and so lubricate every part of the mechanism. The annular space 13 and the radial slots 8 as well as the longitudinal groove 4, form or act as reservoirs to hold an ample supply of lubricant for a great number of hours of continuous operation. Should the surfaces of the spindle and the sleeve become dry or should said sleeve become tight upon said spindle from any accidental cause, no harm will be done, for then the said sleeve itself will act as a larger spindle, and the box 10 will freely revolve upon said sleeve. By my improved box, it will thus be observed that I provide greatly increased areas of bearing surfaces, not otherwise obtainable without the use of the loose sleeve. The adjacent ends of both the sleeve and the box abut against the butting ring 5 and the nut 6, and both these parts are retained in proper position by said ring and said nut alone. In order to remove the wheel from the axle, and the sleeve from the spindle and the box, it is only necessary to take off the single nut 6.

What I claim is—

The improved self lubricating axle-box, constructed with a sleeve 7 having a bore tapered to fit the spindle and provided with a smooth exterior surface tapered in a direct line from its inner end outward, and said sleeve arranged to revolve loosely upon the spindle and having a series of radial slots 8 extending longitudinally therein, but terminating a distance away from the ends thereof, a box 10 provided with ribs or wings 11 for preventing its turning in the hub, and provided with a smooth interior surface tapered from its inner end outward to loosely fit and turn upon said sleeve, an annular shoulder 12 formed in the inner face of the box 10 at a point adjacent the outer end thereof, said box being provided with an annular space 13, the outer end of which terminates at the shoulder 12, and said space extending inward in the direction of the length of the box to a point opposite the inner ends of the radial slots in said sleeve, and merging thereat into said inner surface of said box, a hub in which said box is fixed, means for supplying lubricant to the annular space 13 and to the slots 8 from the exterior of the hub, and means which engage the adjacent ends of said box and said sleeve and hold same in position upon the spindle, substantially as herein specified.

In testimony whereof I affix my signature in presence of two witnesses.

THOMAS MOORE.

Witnesses:
D. C. BRIDGES,
L. S. GAY.